United States Patent [19]

Toyomura

[11] Patent Number: 4,623,970

[45] Date of Patent: Nov. 18, 1986

[54] ELECTRONIC EQUIPMENT WHICH OUTPUTS DATA IN SYNTHETIC VOICE

[75] Inventor: Shigeru Toyomura, Kawasaki, Japan

[73] Assignee: Canon Kabushiki Kaisha, Tokyo, Japan

[21] Appl. No.: 818,896

[22] Filed: Jan. 15, 1986

Related U.S. Application Data

[63] Continuation of Ser. No. 657,059, Oct. 3, 1984, abandoned, which is a continuation of Ser. No. 483,748, Apr. 15, 1983, abandoned, which is a continuation of Ser. No. 203,443, Oct. 3, 1980, abandoned.

[30] Foreign Application Priority Data

Nov. 7, 1979 [JP] Japan .................................. 54-143216

[51] Int. Cl.[4] .............................................. G10L 5/00
[52] U.S. Cl. ..................................... 364/513.5; 381/51
[58] Field of Search ..................................... 381/51–53; 364/513.5, 705, 709, 710

[56] References Cited

U.S. PATENT DOCUMENTS

| | | | |
|---|---|---|---|
| 4,163,120 | 7/1979 | Baumwolspiner | 179/1.5 M |
| 4,185,169 | 1/1980 | Tanimoto et al. | |
| 4,211,892 | 7/1980 | Tanimoto et al. | 179/1.5 M |
| 4,255,618 | 3/1981 | Danner et al. | 179/1.5 M |

OTHER PUBLICATIONS

Flanagan, Speech Analysis, Synthesis and Perception, Springer–Verlag, New York, 1972, p. 71.
T. Wigfall, "Microprocessor Based Voice Synthesizer . . .", Digital Design, Mar. 1977, pp. 15, 16.

Primary Examiner—E. S. Matt Kemeny
Attorney, Agent, or Firm—Fitzpatrick, Cella, Harper & Scinto

[57] ABSTRACT

In a talking calculator, a condition memory (F1–F4) causes selection of one kind of voice information sound quality, such as male or female, whereby, for example, a male voice announces positive numbers and a female voice announces negative numbers.

12 Claims, 1 Drawing Figure

ELECTRONIC EQUIPMENT WHICH OUTPUTS DATA IN SYNTHETIC VOICE

This application is a continuation, of application Ser. No. 657,059 filed 10/3/84, which is a continuation of Ser. No 483,748 filed 4/15/83, which is a continuation of Ser. No. 203,443 filed 10/3/80, now abandoned.

BACKGROUND OF THE INVENTION

1. Field of the Invention

This invention relates to an electronic equipment which outputs data in synthetic voice, and more particularly to an electronic equipment which is provided with memory for storing digital signals expressing voice which has a plural number of kinds of sound qualities and which is designed to generate the stored digital signal in the form of voice having a plural number of kinds of sound qualities selectively corresponding to the switch data, key data, or other data.

2. Description of the Prior Art

In a conventional electronic equipment which outputs synthetic voice, for example, electronic voice desk calculator, external communication of data was performed by a single kind of voice, for example, by male voice. It had a drawback that with only a male voice the voice was hard to hear when there was a lot of voice in external environment. On the other hand, a voice synthesizing unit which generates female voice was developed recently and an electronic voice desk calculator which performed external communication with female voice appeared. However, hearing a female voice over a long period of time has been found annoying among the users of electronic voice desk calculator and it was problematic that in calm environment many users preferred male voice to female voice.

SUMMARY OF THE INVENTION

An object of this invention is to offer an electronic equipment capable of performing external communication using voice having a sound quality most easily heard in spite of the noise in external environment by removing said detects in conventional equipment and by making it possible to select arbitrarily various voices having different sound or voice qualities such as male high voice, male low voice, boy's voice, female high voice, and female low voice as required. (As used herein, "voice quality" means "the sound quality of a voice that identifies it as the voice of a person of, for example, a particular age or sex.")

Another object of this invention is to offer an electronic equipment in which voices having different sound qualities are selected automatically corresponding to the kind of data to be announced as, for example, male voice is used when announcing positive numerical data and female voice is used when announcing negative numerical data, so that the kind of data announced can be discriminated clearly.

Still an other object of the invention is to offer an electronic voice desk calculator in which the registration data such as "123+456=" in normal calculation is announced with male voice and the data of answer such as "579" obtained as a result of arithmetic operation is announced with female voice so that the registration data and the data about the result of arithmetic operation can be clearly discriminated.

Still an other object of this invention is to offer an electronic voice desk calculator in which male voice is used for normal arithmetic operation data and female voice is used for the result of arithmetic operation that has the overflow and for an overflown situation to announce distinctly the difference between normal arithmetic operation state and the overflow state.

Still an other object of this invention is to offer an electronic voice desk calculator in which normal numerical value data in a calculator having time measuring function, for example 123+456=579, is announced with male voice and time data, for example, 3 o'clock minutes and 45 seconds, May 25th, is announced with female voice.

Still an other object of this invention is to offer an electronic voice desk calculator in which a large numerical value data is divided into groups of 3 digits and voices of different qualities are used for announcement of the several groups, for example a 9 digit numerical value data 123, 456, 789, the numerical value 123 of most significant 3-digits is announced in female voice, the next 3 digit value 456 is announced in male voice, and the most insignificant 3-digit value 789 is announced with child's voice, or announcement of numerical values preceding a certain number of digits, for example, the numerical value 12345 which precedes 4 digits is announced in female voice and the numerical value which follows, for example 6789 is announced with male voice, so that the fact that the result of arithmetic operation has exceeded a certain digit can be understood easily and in which the digit can be specified at will.

Still another object of this invention is to offer an electronic voice desk calculator in which numerical value data and arithmetic operation data are announced clearly and distinctively such as the important numerical value data 123., 456., and 579. being announced with female voice and the arithmetic operation data such as + and = being announced with male voice.

Other objects of this invention will be clear from the following description of example given by referring to the drawings.

DESCRIPTION OF THE PREFERRED EMBODIMENTS

Figure 1:
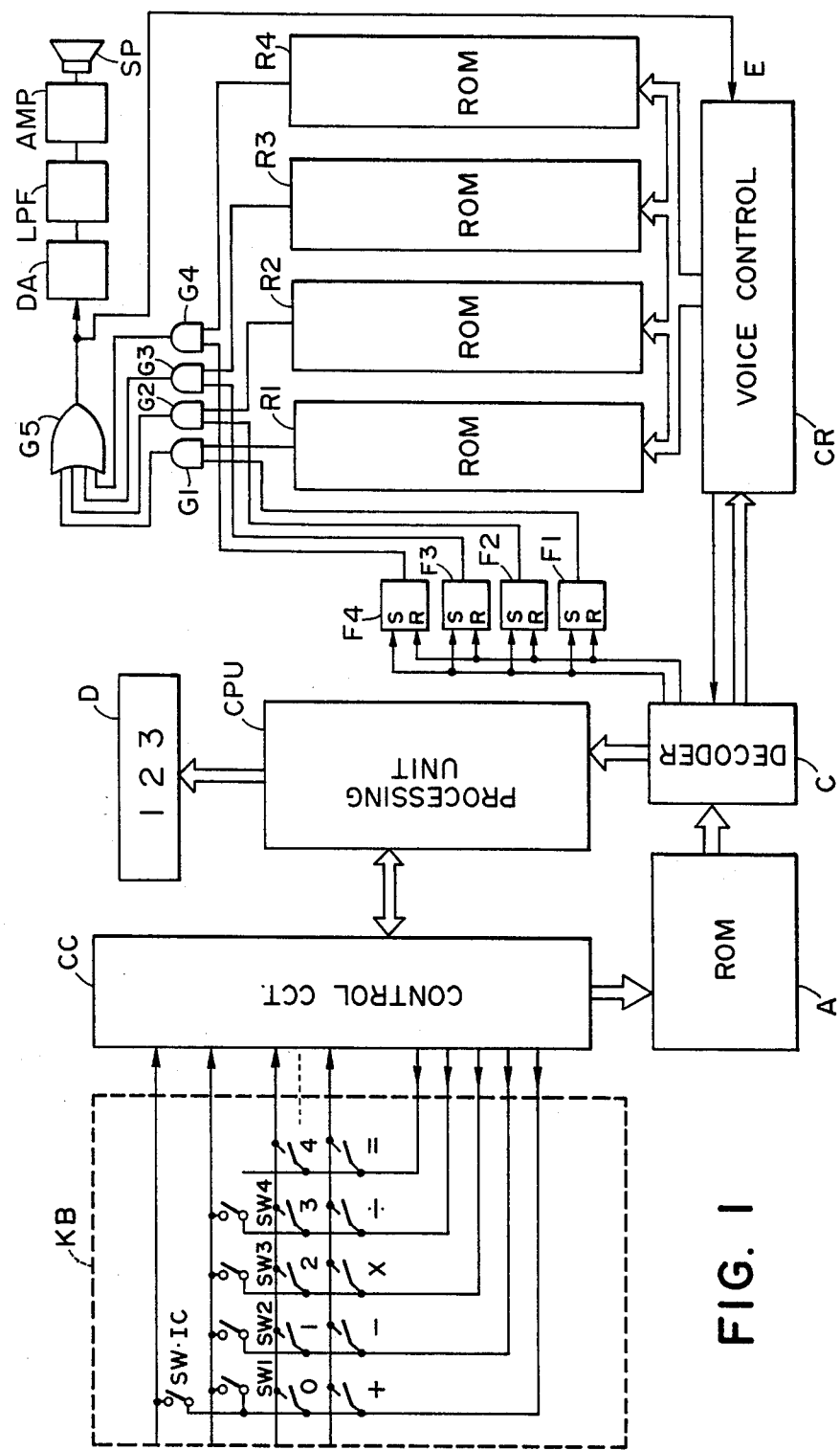
FIG. 1 is a block diagram showing an example of the configuration of the invented electronic voice desk calculator.

This invention will now be described more in detail referring to the drawing.

FIG. 1 shows an example of the configuration of the invented electronic voice desk calculator. In the configuration shown in the drawing, KB is the keyboard section for inputting data necessary for calculation such as numerical data and arithmetic data on which are arranged, beside the group of ordinary keys such as 0 ~ 9, +, −, ×, ÷ and = , the voice quality selector switches SW1, SW2, SW3 and SW4 to select the voice quality of male voice, boy's voice, female voice, etc., item count switch SW IC to designate whether or not to count the number of items, etc. CC is the control circuit which supplies key scan signal to the keyboard section KB, and performs sequential control by deciding the kinds of operated keys by the key scan signal or detecting the state of each key and switch. A is a read only memory (ROM) which stores micro instruction datas for performing sequential control and which generates different micro instruction datas corresponding to the control signal coming from the control circuit CC. In other words, processing data needed in calculation such as data about registered number and arithmetic operation or control data for invented voice quality control are stored. C is the ROM decoder used to decode the code signal representing the data from the read only memory A. CPU is the arithmetic section which performs arithmetic operation according to the decoded data from the ROM decoder C, which is provided with a group of random access memories (RAM) which memorize and hold numerical data once, adders for executing arithmetic operation, decoders for displaying registration data and the data about the results of arithmetic operations, memory group for storing time measuring data such as year, month, day, hour, minute, counters which count these time measuring data every moment, and control circuits which perform other controls. D is the displayer used to display registration data and data about results of arithmetic operation. R1, R2, R3 and R4 are voice read only memories (ROM) which store voice digital data respectively. ROM R1 stores male voice data expressing coded word group consisting of zero, one, two, three, four, —, plus, minus, multiply, divide, overflow, item count, etc., ROM R2 stores coded boy's voice data expressing the same word group as R1, ROM R3 stores coded female voice data expressing the same word group as R1, and ROM R4 stores coded girl's voice data expressing the same word group as R1. CR is the voice control section consisting of address counters etc. for making access to voice ROM's R1, R2, R3 and R4, and to pick up of the voice data expressing each word such zero, one, two, three, —, etc. mentioned above, CR decodes, corresponding to the decode data from ROM decoder C, the voice data expressing which word should be generated and, according to the result of the decision, accesses the voice ROM's R1 through R4 respectively, to have these ROM's output the same voice digital data respectively. For example in the case where the word "one" is to be generated, CR has the voice ROM R1 output male voice digital data, has the voice ROM R2 output boy's voice digital data, has the voice ROM R3 output female voice digital data, and has the voice ROM R4 output girl's voice digital data, then has the gates G1 through G4 select which voice digital data of each digital data output at the same time should be passed through and through which voice should external communication be made. F1, F2, F3 and F4 are flip flops which are set and reset respectively by the decoded data from ROM decoder C, and the output of each of these flip flops F1 through F4 is connected to the gates G1 through G4 to control these gates respectively. In other words, the gates G1 through G4 are all closed when the flip flops F1 through F4 are all reset and the voice digital data from the voice ROM's R1 through R4 are all cut off. And, when only the flip flop F1 is set, only the gate G1 is opened, and only the male voice digital data from the voice ROM R1 is passed through the gate group and supplied to the OR gate G5. Similarly when only the flip flop F2 is set, only the gate G2 is opened and only the boy's voice digital data from the voice ROM R2 is supplied to the OR gate G5, when only the flip flop F3 is set, only the gate 3 is opened and only female voice digital data from the voice ROM R3 is supplied to the gate G5, and when only the flip flop F4 is set, only the gate G4 is opened and the girl's voice digital data from the voice ROM R4 is supplied to the OR gate G5. The voice digital data that have passed through the OR gate G5 are all supplied to the digital-analog converter DA to be converted into voice analog data and, by way of the low-pass filter LP F and amplifier AMP supplied to the loudspeaker to generate the voice of each voice quality and at the same time, as the end signal E, applied from the OR gate G5 to the voice control section CR to notify CR that the voice digital data of each word has been ended and to have CR stop reading from voice ROM.

In the electronic voice desk calculator according to this invention, it is possible, because of said configuration, to perform external announcement by using, properly a plural number of kinds of voices, each having a plural number of kind of voice qualities.

Next, for the operator of the electronic desk calculator to select an arbitrarily desired voice and have the invented electronic voice desk calculator perform external announcement, he should first turn ON the switch SW1 on the keyboard KB. The control circuit CC detects the On state of the switch SW1 and informs ROM A of this fact. ROM A issues an instruction to set the flip flop F1, the ROM decoder decodes the instruction and sets the flip flop F. When the flip flop F1 is set, the gate G1 is opened and only the male voice digital data from the voice ROM R1 is passed through the gate G1 and male voice is spoken from the loudspeaker SP.

Similarly, when the switch SW2 on the keyboard KB is turned ON, the flip flop F2 is set, the boy's voice digital data is selected from the voice ROM R2, and, when the switch SW3 is turned ON, the female voice digital data is selected from the voice ROM R3, and further, when the switch SW4 is turned ON, the girl's voice digital data is selected from the voice ROM R4.

In this way, the operator of the electronic desk calculator is enabled to select desired voice at will by, for example, turning ON the switch SW3 if the desires female voice.

Next, in order to announce positive numerical data by male voice and negative numerical data by female voice, first various kinds of arithmetic processings are performed in the arithmetic section CPU and when the result obtained is a positive numerical value, the CPU informs the control circuit CC that the result of the arithmetic operation is "positive". The control CC directs ROM A to output instruction to set the flip flop F1, an instruction to set the flip flop F1 is output from ROM A, the flip flop F1 is set, and the positive numerical data is announced by the male voice from the voice ROM R1.

On the other hand, when the result of the arithmetic operation is a negative numerical data, an instruction to set the flip flop F3 is output and female voice is generated.

The decision whether the result of the arithmetic operation is positive or negative, is made by normal arithmetic processing of electronic computer and can be realized by well known technique. Moreover, the discrimination between the registration data and the data about the result of arithmetic operation is also a well known technique. The arithmetic section CPU discriminates between registration data and the data about the result of arithmetic operation, sets the flip flop F1 when speaking out the registration data, sets the flip flop F3 when speaking out the result of arithmetic operation. As a result the registration data is communicated by male voice and the result of arithmetic operation is communicated by female voice and each can be spoken out clearly differently.

Next, the discrimination between the number of item counts and other numerical data can be made easily, and speaking out distinctively normal data about arithmetic operation and the result of arithmetic operation which has overflown, or overflow state can be realized by well known technique similar to the ones described above. Further, it is also possible to distinguish normal numerical data, time data, and large numerical data by the digit positions, and to distinguish between numerical data and the function key data such as + (plus) and − (minus). As is clear from the description given so far, according to this invention the operator of the electronic desk calculator is enabled to select by himself a voice having the most understandable voice quality arbitrarily and establish announcement by voice, and to have the electronic desk calculator cast by using distinctively different kind of voices for example, the male voice and female voice and by distinguishing between an important data and less important data and to increase drastically the functions of electronic voice desk calculator compared with the conventional ones.

What I claim is:

1. An electronic device comprising:
   a voice memory for storing a plurality of digital signals, each signal representing one of a plurality of kinds of voice information which information has the same meaning, each kind of voice information having a different sound quality;
   an information memory for storing information to be produced as output;
   selecting means for selecting one of said digital signals having a desired sound quality, said selecting means comprising a condition memory for storing a selecting condition for said selecting means selecting said ones of said digital signals in accordance with said condition stored in said condition memory; and
   output means operable in response to said selecting means for utilizing said selecting digital signals to produce as a synthetic voice output at least a portion of said information from said information memory.

2. An electronic device as set forth in claim 1, wherein said selecting means includes means for selecting one of said plurality of digital signals in accordance with positive and negative information which is included in the information to be produced.

3. An electronic device as set forth in claim 1, wherein said selecting means selects one of said plurality of digital signals in accordance with registration information and information concerning the result of an arithmetic operation which informations are included in the information to be produced.

4. An electronic device comprising:
   a voice memory for storing a plurality of digital signals, each signal representing one of a plurality of kinds of voice information which information has the same meaning, each kind of voice information having a different sound quality;
   an information memory for storing information to be produced as output;
   a discriminating memory for storing discrimination information to formulate an output format of the information to be produced as output;
   selecting means for selecting ones of said digital signals having a desired sound quality, said selecting means comprising a condition memory for storing a selecting condition for said selecting means selecting said ones of said digital signals in accordance with said condition stored in said condition memory; and
   output means operable in response to said selecting means for utilizing said selected digital signals to produce as a synthetic voice output a portion of said information from said information memory.

5. An electronic device as set forth in claim 4, wherein said discrimination memory includes a memory for storing item count information.

6. An electronic device as set forth in claim 4, wherein said discrimination memory includes a memory for storing signal representing overflow state.

7. An electronic device as set forth in claim 4, wherein said discrimination memory includes a memory for storing digit places of said information to be produced as output.

8. An electronic device as set forth in claim 4, wherein said discrimination memory includes a memory for storing the kind of said information to be produced as output.

9. An electronic device for outputting information in a synthetic voice, comprising:
   memory means for storing information to be produced as output;
   selecting means for selecting vocal sound quality for the information to be produced as output, said selecting means having a manual switch for selecting one of a plurality of sound qualities;
   output means coupled to said memory means and said selecting means, for producing as a synthetic voice output the information to be produced as output with the one of said plurality of sound qualities selected by said selecting means; and
   a condition memory for storing a selection instruction for said manual switch.

10. An electronic device for outputting information in synthetic voice as set forth in claim 9, wherein said output means includes a digital voice memory corresponding to the information to produce a synthetic voice representative of the information.

11. An electronic device for outputting information in a synthetic voice as set forth in claim 10, wherein said digital voice memory includes a memory for storing digital voice information having a different sound quality.

12. An electronic device for outputting information in a synthetic voice, comprising:
   memory means for storing information to be produced as output;
   first output control means coupled to said memory means, for producing the information to be produced as output with a voice having a first sound quality;
   discriminating means for discriminating specific information out of the information to be produced as output of said memory means wherein said discriminating means includes a condition memory for storing a condition for discrimination; and
   second output control means coupled to said discriminating means, for producing the specific information discriminated by said discriminating means as output with a voice having a second sound quality.

* * * * *

UNITED STATES PATENT AND TRADEMARK OFFICE
CERTIFICATE OF CORRECTION

PATENT NO. : 4,623,970  Page 1 of 2

DATED : November 18, 1986

INVENTOR(S) : Shigeru Toyomura

It is certified that error appears in the above-identified patent and that said Letters Patent is hereby corrected as shown below:

Column 1, line 27, "voice in" should read --voice sound in--.

Column 1, line 59, "an other" should read --another--.

Column 1, line 67, "an other" should read --another--.

Column 2, line 6, "an other" should read --another--.

Column 2, line 13, "an other" should read --another--.

Column 2, line 19, "3-digits" should read --3 digits--.

Column 1, line 28, "external" should read --the external--.

Column 2, line 67, "datas" should read --data--.

Column 2, line 68, "datas" should read --data--.

Column 3, line 66, "and the" should read --and only the--.

Column 4, line 4, "loudspeader" should read --loudspeaker--.

Column 4, line 17, "invented electronic voice desk calculator perform" should read --electronic voice desk calculator of the invention perform--.

UNITED STATES PATENT AND TRADEMARK OFFICE
CERTIFICATE OF CORRECTION

PATENT NO. : 4,623,970

DATED : November 18, 1986

INVENTOR(S) : Shigeru Toyomura

It is certified that error appears in the above-identified patent and that said Letters Patent is hereby corrected as shown below:

Column 4, line 23, "F." should read --F1.--.

Column 4, line 36, "the desires" should read --he desires--.

Column 5, line 5, "overflown," should read --overflowed,--.

Column 5, line 16, "cast" should be deleted.

Column 5, line 18, "an" should be deleted.

Column 5, lines 19-20, "drasti-/cally" should read --dramatically--.

Column 5, line 39, "selecting" should read --selected--.

Column 5, line 62, "discriminating" should be --discrimination--.

Signed and Sealed this

Twenty-eighth Day of April, 1987

Attest:

DONALD J. QUIGG

*Attesting Officer*  *Commissioner of Patents and Trademarks*